UNITED STATES PATENT OFFICE.

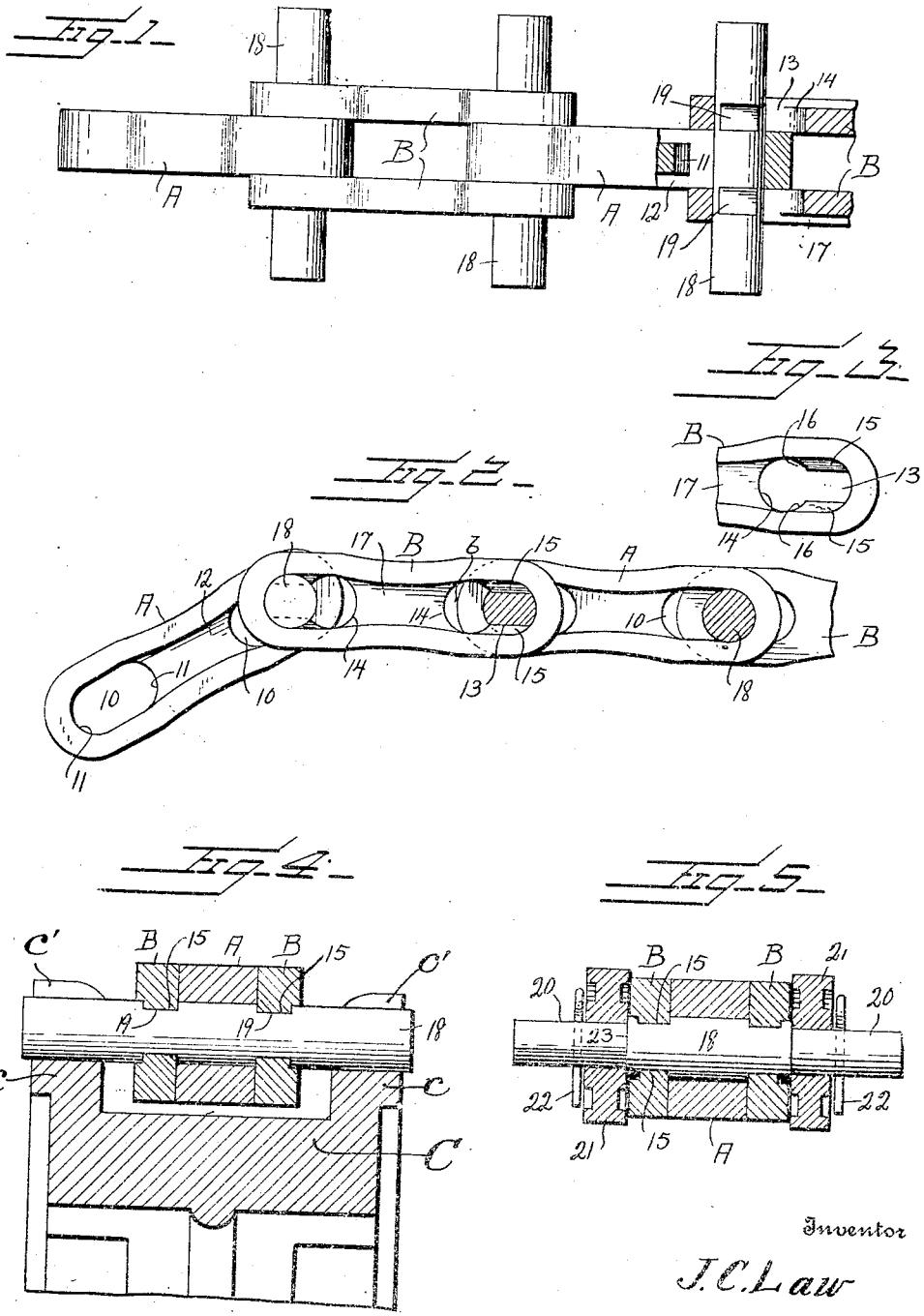

JAMES C. LAW, OF CARBONDALE, PENNSYLVANIA

DRIVE-CHAIN.

1,309,142.  Specification of Letters Patent.  Patented July 8, 1919.

Application filed August 3, 1918. Serial No. 248,192.

*To all whom it may concern:*

Be it known that I, JAMES C. LAW, a citizen of the United States, residing at Carbondale, in the county of Lackawanna and State of Pennsylvania, have invented certain new and useful Improvements in Drive-Chains, of which the following is a specification, reference being had to the accompanying drawings.

This invention relates to improvements in drive chains of that character in which the links are detachably connected to each other by means of removable pintles.

One object of this invention is to so form these links and pintles that the drive chain may be used if desired in connection with double sprocket wheels whereby the body of the links may be supported out of contact with the sprocket wheel, and provide means for locking the pintles to the links so as to prevent the accidental relative lateral movement of the pintles and links, thus preventing the accidental disconnection of the links when in operation.

Another object in this connection is to so form the pintle and links that when the pintle bearing is worn down, the pintle may be rotated to a new position with relation to the center links to thereby present a new and unworn bearing surface to the center link and to the sprocket flanges of a double sprocket wheel and thus increase the life of such pintles and render the wear thereon more uniform.

Another object is to so construct the chain that it may be readily assembled or disassembled without, however, being open to accidental detachment of the links in the service.

Other objects will appear in the course of the following description.

My invention is illustrated in the accompanying drawings, wherein:—

Figure 1 is a top plan view of a chain constructed in accordance with my invention, the chain being partly in section;

Fig. 2 is a side elevation of the chain illustrated in Fig. 1, two of the pintles being in section;

Fig. 3 is a fragmentary side elevation of one of the links B;

Fig. 4 is a fragmentary section through a double flanged sprocket wheel showing the manner in which my links are engaged therewith; and Fig. 5 is a transverse sectional view of a chain constructed in accordance with my invention showing the use of rollers thereon to form a roller chain.

Referring to these drawings, it will be seen that the drive chain is composed of the middle links A and the lateral or side links B. A pair of said links is disposed alternately in succession to each of the middle links. Each middle link is formed at its opposite ends with the longitudinally extending slots 10, these slots having rounded or circular ends 11. Each slot 10 has parallel side walls and the diameter of the semi-circular ends is equal to the width of the slot. Preferably the middle portion of each of the links A is reduced in thickness as at 12 in order to lighten the weight of the links.

The links B are arranged, as before stated, in pairs and the links of each pair are formed at their opposite ends with the elongated slots 13 having the general form of "key-hole" slots. Thus the inner end 14 of each slot is enlarged and circular. The outer end of the slot is preferably, though not necessarily circular, and the upper and lower walls of each are parallel. These upper and lower walls 15 of the parallel portion of each key-hole slot are preferably reduced in thickness so that they have the form of ribs, each rib intersecting the enlarged circular end of the slot so that the inner end of each rib is cut away on a circle, as at 16. It will be seen from Fig. 5 that these rib-like walls 15 of the slot 13 are flush with the inner face of the link, but terminate short of the outer face of the link. The middle of the link is preferably reduced in thickness as at 17. The pintle which is used to connect each middle link to the next succeeding pair of outer links B is designated 18. The body of this pintle is circular in cross section, the diameter of the pintle being slightly less than the width of the slots 10 and being equal to the diameter of the circular opening *b* of the links B, formed by the wall 14 and the ends 16 of the upper and lower ribs 15. Each pintle, inward of its ends, is formed with upper and lower transversely extending grooves 19, the bottom of the grooves being flat and the grooves being parallel to each other and of a width to receive the ribs or walls 15 of each link.

It will be noted that the middle portion of the pintle, as shown in Fig. 5, has a uniform diameter for a distance equal to the combined thicknesses of the links A and B, and in Fig. 4 the pintle 18 has a uniform diameter from end to end.

The outer ends of the pintles may have the same diameter as the middle portion of the pintle as shown in Fig. 4 or may be reduced in diameter as in Fig. 5, as at 20, to receive thereon a roller 21 which is held in place by means of a cotter pin 22 or any other suitable means for this purpose. The distance between the shoulders 23 of these reduced portions is slightly greater than the combined width of the single link A and the pair of links B. While I have heretofore referred to the center link A as being constructed in one piece, it will be obvious that it might be in two pieces, in other words, that there might be two center links.

In assembling the links, a middle link A is disposed with its end between the ends of two outer links B and then a pintle 18 is inserted through the portions $b$ of the links B. The pintle may turn within the circular openings $b$ until its grooves 19 are disposed to receive the ribs 15. Then the pintle may be shifted outward toward the ends of the links B to the position shown in Fig. 2. The pintle is then locked from any lateral movement which would disconnect it from the links A and B. It will be obvious now that any strain coming on the chain composed of the links A and B will hold the links B with the walls or ribs 15 in engagement with the pintle, so that when the chain is under strain, the links cannot possibly become detached from each other. By slacking the chain it is possible to so shift the links with relation to each other as to permit the pintles to be shifted into the inner ends of the links B and then withdrawn laterally.

As before stated, the pintles 18 may carry rollers 21 thereon so that the chain may be used as a roller chain. Without these rollers the chain may be used as a drive chain, a conveyer chain or an elevator chain. Furthermore, by forming the pintle with out-bearings 20, the chain may be used either as a roller chain or be used in connection with a double sprocket wheel, as illustrated in Fig. 4, where the wheel is designated C, the wheel being illustrated in section. The wheel is provided with the double flanges $c$, these flanges having depressions $c'$ at regular intervals for the reception of the out-bearings of the pintles 18.

By using a double flange sprocket wheel, as in Fig. 4, the links of the chain are never in contact with the face of the wheel. Furthermore, by this means the driving strains are exerted on the out-bearings of the pintles and against the links close to the center of movement between each connecting set of links, thus giving a double bearing, as compared to a single bearing, where chains are driven against single toothed sprockets. There is hence less friction developed in operation and less tendency for the chain to become distorted in operation.

The middle links and the lateral links may be formed with attachments of varying character and be provided with means for the attachment of buckets, blades, scrapers and other like parts, and these attachments may be cast or forged with the links or bolted thereon. The links may be engaged with each other either when the middle link and the side links are in a horizontal position or when the middle link is in an angular relation to the coacting pair of side links. In other words, the links may be connected in any position where the cylindri-form eyes $b$ of the outer links are directly opposite the elongated eye of the middle link.

Attention is particularly called to the fact that the walls or ribs 15 of the slots 13 coacting with the notches 19 constitute means whereby the pintle 18 is held from rotation with relation to the links B. In other words, these walls act as a wrench causing the pintle to turn with the oscillations of the links B but the pintle turns with relation to the corresponding link A and thus the wear of the pintle bearing on the middle link is distributed. Furthermore, when the pintle bearing is worn down in operation, the pintle may be pushed into the cylindri-form eye $b$, thus disengaging it from the ribs 15 and rotated 180° and again re-inserted between the ribs 15 so that a new face of the pintle is presented to the rounded end wall of the slot 10. Thus a new and unworn bearing surface is presented to the center link and thus the operating surface of the pintles is increased about 100%.

Furthermore, where the pintles are laterally extended, as in Fig. 4, for the purpose of engaging with a double sprocket wheel, pressure will come upon the pintles in one direction depending upon the direction of rotation of the sprocket wheel, and as a consequence wear will be much greater on one side of the pintle than on the other, assuming that the sprocket wheel is rotating always in one direction, and this wear may be rendered more uniform by withdrawing the pintles from their locked engagement to the circular openings $b$ and rotating the pintle 180° therein so as to bring a new surface with which the tooth on the sprocket wheel may engage. It is to be noted that the pintle is rotated to this new position without removal from the chain or disconnection of the chain.

Another and important advantage of having the pintles project a distance beyond the outer links is that these detachable chains are most frequently used for conveying wet coal and culm at collieries where the water is impregnated with sulfuric acid, causing the chains to corrode or rust and the pintles to become stuck in the slots 13. Particularly is this true where the pintles are made to fit accurately which, of course, they should be. Where the pintles do not project beyond the outer faces of the links B, it is difficult to shift a rusted or corroded pintle with relation to the outer links, without the use of tools, but by having the pintles project on opposite sides beyond the outer links, the adhesion between the pintles and the links may be readily ruptured, and even under ordinary circumstances a pintle with out-bearings may be forced back by hand to shift it relative to the outer links, which would not otherwise be the case.

Further, it will be noted that by causing the pintles to project beyond the outer face of the links B, the pintles may be used for engagement by a double sprocket wheel as in Fig. 4, or may carry supporting wheels, as in Fig. 5.

Attention is again called to the fact that the pintles may be inserted into position with the links at any angle to each other or removed from the links without regard to the angle at which they are disposed. The pintles may be made of malleable iron or could be made from mild bar steel with the grooves 19 depressed in the link when the steel is cold. This would render the pintle relatively inexpensive as compared to a forged steel pin. At the same time the full diameter of the pin gives it very great strength.

I claim:—

1. A chain composed of alternate middle links and pairs of outer links, each middle link being formed at each end with an opening having semi-circular end walls, each of the outer links having elongated slots in its ends, each slot terminating at its inner end in a circular enlargement, and pintles corresponding in cross section to the diameter of the circular enlargement and connecting the middle links to the outer links, the walls of each slot in the said links being formed to interlock with the corresponding pintle to prevent lateral movement of the pintles relative to the links and prevent rotary movement of the pintles with relation to the outer links, the pintles being reduced at their outer ends beyond the said outer links.

2. A chain composed of alternate middle links and pairs of outer links, each middle link being formed at each end with an opening having semi-circular end walls, each of the outer links having elongated slots in its ends, each slot terminating at its inner end in a circular enlargement, pintles corresponding in cross section to the diameter of the circular enlargement and connecting the middle links to the outer links, the walls of each slot in the said links being formed to interlock with the corresponding pintle to prevent lateral movement of the pintles relative to the links and prevent rotary movement of the pintles with relation to the outer links, the pintles being reduced at their outer ends beyond the said outer links, and rollers rotatably mounted upon the reduced ends of the pintles.

3. A chain composed of alternate middle links and pairs of outer links, each middle link being formed at each end with an opening having semi-circular end walls, each of the outer links having elongated slots in its ends, each slot terminating at its inner end in a circular enlargement, and pintles, circular in cross section throughout substantially their entire length, and having a diameter equal to the diameter of the circular enlarged portion of each slot, the pintles at diametrically opposite points adjacent each end being formed with a pair of parallel grooves, the grooves extending tangential to a circle concentric to the axis of the pintle and said grooves receiving the opposite parallel walls of the elongated slots in the outer links and interlocking therewith against independent rotary movement or lateral movement, said pintles being rotatable in the enlarged portions of the slots, whereby the pintles may be reversed when worn on one side, the pintles being extended beyond the outer links sufficiently to permit force to be applied to the pintles to shift them relative to the outer links and to provide bearings.

In testimony whereof I hereunto affix my signature in the presence of two witnesses.

JAMES C. LAW.

Witnesses:
FREDERIC B. WRIGHT,
FREDERICK S. STILL.